United States Patent [19]
Nagai et al.

[11] Patent Number: 5,747,896
[45] Date of Patent: May 5, 1998

[54] ELECTRIC ACTUATOR

[75] Inventors: Shigekazu Nagai, Ibaraki-ken; Tadasu Kawamoto, Okayama, both of Japan

[73] Assignee: SMC Kabushiki Kaisha, Shimbashi, Japan

[21] Appl. No.: 711,687

[22] Filed: Sep. 5, 1996

[51] Int. Cl.$^6$ .............................. H02N 7/06; F16H 27/02; F16H 1/18

[52] U.S. Cl. .................. 310/20; 310/80; 310/83; 74/89.15; 74/424.8

[58] Field of Search ................... 310/20, 80, 83; 74/22 R, 22 A, 84 R, 88, 89.15, 424.8 R

[56] References Cited

U.S. PATENT DOCUMENTS

| | | | |
|---|---|---|---|
| 4,573,566 | 3/1986 | Roman | 74/89.15 |
| 5,454,278 | 10/1995 | Kasuga | 74/459 |
| 5,637,940 | 6/1997 | Nagai et al. | 310/80 |

FOREIGN PATENT DOCUMENTS

| | | |
|---|---|---|
| A-0-111-565 | 5/1983 | European Pat. Off. . |
| A-0-483-384 | 5/1991 | European Pat. Off. . |
| A-0-517-684 | 4/1992 | European Pat. Off. . |
| A-41-18-627 | 1/1992 | Germany . |

OTHER PUBLICATIONS

Catalog No. 148–2, 1994 Catalog of THK and NSK Co., Ltd., Japan.

*Primary Examiner*—Clayton E. Laballe
*Assistant Examiner*—Judson H. Jones
*Attorney, Agent, or Firm*—Morgan & Finnegan LLP

[57] ABSTRACT

An electric actuator has an elongate base, a power unit and an encoder device which are fixedly mounted on respective opposite ends of the base in confronting relation to each other, a slide table displaceable longitudinally along the base, a ball screw for transmitting rotational power from the power unit to the slide table, and a pair of guide lands integral with the base for guiding the slide table longitudinally along the base.

8 Claims, 9 Drawing Sheets

ELECTRIC ACTUATOR

BACKGROUND OF THE INVENTION

1. Field of the Invention

The present invention relates to an electric actuator having a slide table displaceable in response to operation of a rotational power unit.

2. Description of the Related Art

Electric actuators have heretofore been used as means for conveying workpieces. One conventional design of such electric actuators is basically constructed of an elongate frame, an electric motor disposed in the frame, a ball screw for converting rotary motion generated by the electric motor into linear motion and transmitting the linear motion to another member, a pair of parallel guide rails fixedly mounted on an upper surface of the frame, and a slide table displaceable longitudinally along the frame by the ball screw while being guided by the guide rails.

The ball screw is rotatably supported by a bearing at one end of the ball screw. The electric motor has a motor shaft connected coaxially to the other end of the ball screw by a coupling. An encoder is positioned near the electric motor for detecting the angular displacement, the rotational speed, etc. of the electric motor.

The frame of the conventional electric actuator is made of aluminum and hence its rigidity is relatively poor. Therefore, the accuracy of linearity and parallelism of the slide table virtually depends on the guide rails which are made of stainless steel which is highly rigid. The conventional electric actuator has a height or vertical dimension equal to the sum of the height of the frame and the height of the guide rails fixedly mounted on the upper surface of the frame. It is not possible to restrict the height of the electric actuator while keeping a required high level of rigidity thereof.

Since the frame and the guide rails are separate parts, the conventional electric actuator is made up of a relatively large number of parts, assembled in a relatively large number of steps, and hence expensive to manufacture.

Another problem of the conventional electric actuator is that when it is assembled, the ball screw has to be positionally aligned accurately in a complex process because the ball screw and the motor shaft have to be positioned and connected coaxially to each other by the coupling, and the ball screw needs to be disposed along the axis of the frame.

SUMMARY OF THE INVENTION

It is a general object of the present invention to provide an electric actuator which has a height or vertical dimension restricted while keeping a required high level of rigidity, and which can be manufactured inexpensively.

A major object of the present invention is to provide an electric actuator which does not require a ball screw to be positionally aligned and allows the ball screw to be assembled in position with ease.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
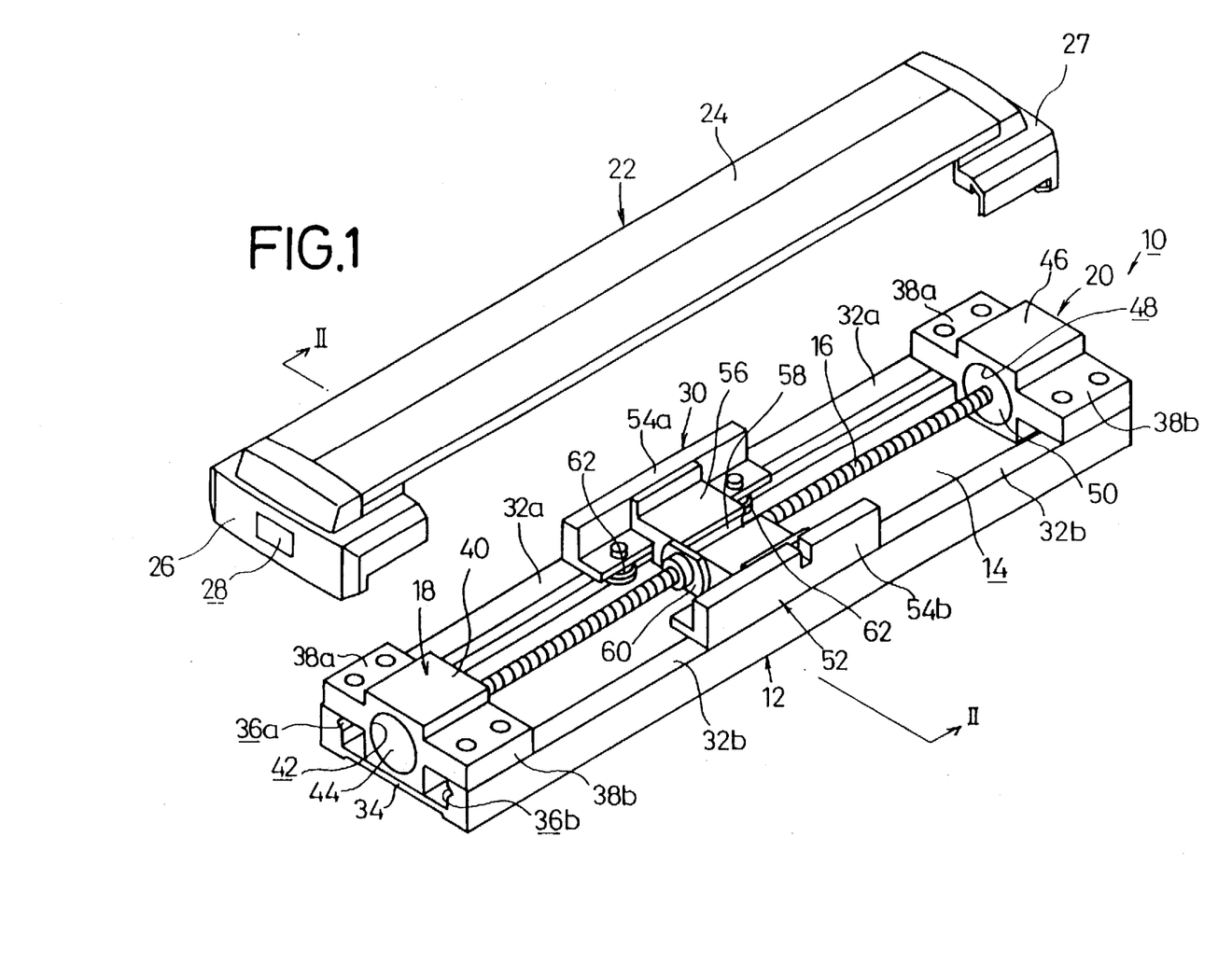
FIG. 1 is an exploded perspective view of an electric actuator according to a first embodiment of the present invention.

As shown in FIG. 1, an electric actuator 10 according to a first embodiment of the present invention comprises an elongate base 12, a ball screw 16 longitudinally supported in an elongate recess 14 defined in an upper surface of the base 12, a power unit 18 mounted on a longitudinal end of the base 12 for rotating the ball screw 16 about its own axis, an encoder device 20 mounted on the other longitudinal end of the base 12, and a cover 22 covering the recess 14 in the base 12.

The cover 22 comprises a top cover 24 closing the upper surface of the base 12 and a pair of side covers 26, 27 attached respectively to opposite longitudinal ends of the top cover 24 and closing respective opposite longitudinal ends of the base 12. The side cover 26 has a window 28 defined therein for passing therethrough leads (not shown) electrically connected to the power unit 18 and the encoder device 20. The electric actuator 10 also has a slide mechanism 30 displaceable longitudinally along the base 12 in response to rotation of the ball screw 16 while being guided by two pairs of bearing members (described later on) which are positioned in confronting relation to each other one on each side of the ball screw 16.

The base 12 is of a unitary structure made of steel (SPC) or the like by a drawing process, and hence has a high degree of rigidity. The base 12 has a C-channel cross section, and includes a pair of longitudinal guide lands 32a, 32b spaced from each other in the transverse direction of the base 12, and a flat plate 34 extending transversely between the longitudinal guide lands 32a, 32b. The guide lands 32a, 32b have confronting inner wall surfaces having respective grooves 36a, 36b of substantially V-shaped cross section defined longitudinally therein. The bearing members (described later on) rollingly ride in the grooves 36a, 36b.

The power unit 18 comprises a motor housing 40 having a pair of arms 38a, 38b projecting away from each other transversely of the base 12 and fastened to respective upper surfaces of the guide lands 32a, 32b, and a motor unit 44 fitted in a through hole 42 defined axially in the motor housing 40. The motor housing 40 is preferably extrusion-molded of aluminum. The motor unit 44 has a substantially cylindrical casing which houses a rotor and a stator (not shown) that make up an electric motor. The electric motor has a motor shaft on which the rotor is fixedly mounted and which is integrally joined coaxially to an end of the ball screw 16 without the need for a coupling.

The encoder device 20 comprises an encoder housing 46 having a pair of arms 38a, 38b projecting away from each other transversely of the base 12 and fastened to respective upper surfaces of the guide lands 32a, 32b, and an encoder unit 50 fitted in a through hole 48 defined axially in the encoder housing 46. The encoder housing 46 is preferably extrusion-molded of aluminum. The encoder unit 50 has a substantially cylindrical casing which houses a rotary encoder (not shown) for detecting the angular displacement, the rotational speed, etc. of the electric motor and hence the ball screw 16. The rotary encoder has an encoder shaft integrally joined coaxially to an opposite end of the ball screw 16 without the need for a coupling. The holes 42, 48 defined in the motor housing 40 and the encoder housing 46, respectively, have substantially the same diameter as each other.

When the motor unit 44 and the encoder unit 50 are fitted in the respective holes 42, 48 defined in the motor housing 40 and the encoder housing 46, and the motor housing 40 and the encoder housing 46 are fastened to the respective longitudinal ends of the base 12 through the arms 38a, 38b, the motor shaft of the power unit 18, the ball screw 16, and the encoder shaft of the encoder device 20 are coaxially aligned with each other. As a result, the motor unit 44 and the encoder unit 50 can easily be assembled on the base 12 without an alignment process for the motor shaft and the ball screw 16.

The slide mechanism 30 includes a slide table 52 for supporting a workpiece through attachment holes (not shown) defined in an upper surface of the slide table 52. The slide table 52 comprises a pair of slide blocks 54a, 54b slidably on and along the respective guide lands 32a, 32b of the base 12, and a holder block 56 integrally joined to and extending transversely between the slide blocks 54a, 54b. The holder block 56 has an opening 58 defined centrally therein which extends in the axial direction of the ball screw 16. The opening 58 holds therein a substantially cylindrical bearing block 60 which is threaded over the ball screw 16.

Figure 2:
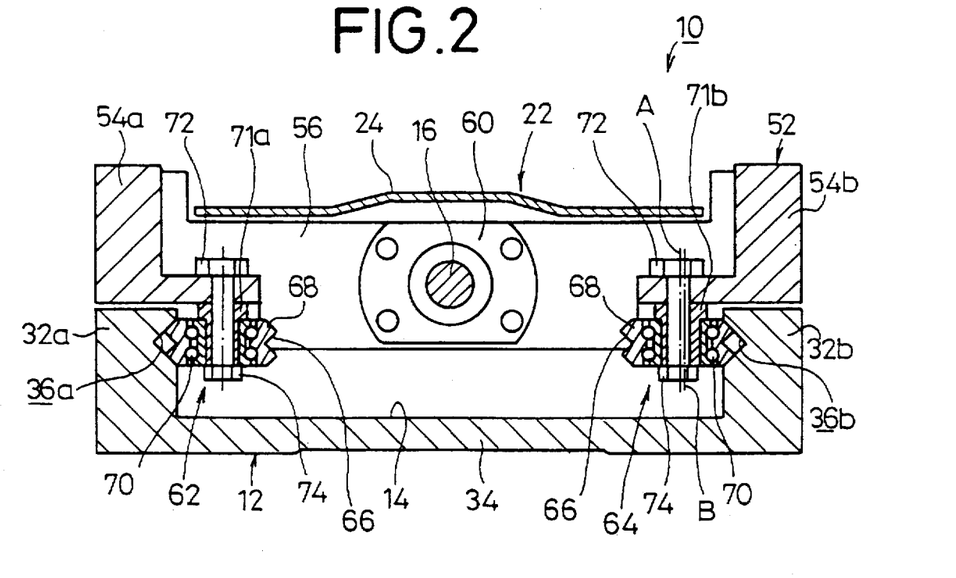
FIG. 2 is a transverse cross-sectional view taken along line II—II of FIG. 1.

As shown in FIG. 2, the slide blocks 54a, 54b support respective pairs of fixed and eccentric bearing members 62, 64 which are spaced from, and confront, each other, and are fastened to the slide blocks 54a, 54b. The fixed and eccentric bearing members 62, 64 comprise respective guide wheels 68 having slanted outer circumferential surfaces 66 rollingly riding in the grooves 36a, 36b in the guide lands 32a, 32b, respective bushings 71a, 71b on which the guide wheels 68 are rotatably supported by ball bearings 70, respective bolts 72 by which the bushings 71a, 71b are fixed to the slide blocks 54a, 54b, and respective nuts 74 threaded over the respective bolts 72.

In each of the fixed bearing members 62, the bolt 72 is axially aligned with the pushing 71a. In each of the eccentric bearing members 64, the bolt 72 has an axis A which is held out of axial alignment with an axis B of the bushing 71b. Therefore, when the bolt 72 is turned about its axis A, the bushing 71b is turned about its own axis B, adjusting the degree by which the guide wheel 68 rollingly engages in the groove 36b. Since the guide wheels 68 of the fixed and eccentric bearing members 62, 64 are positioned laterally of the confronting inner wall surfaces of the guide lands 32a, 32b, no undue limitations are imposed on the height of the guide wheels 68.

The electric actuator 10 is assembled as follows:

The motor unit 44 and the encoder unit 50, which are substantially cylindrical in shape, are fitted respectively in the through holes 42, 48 which are defined in the motor housing 40 and the encoder housing 46, respectively. Then, screws (not shown) are threaded into screw holes defined in the arms 38a, 38b, fastening the motor housing 40 and the encoder housing 46 to the upper surface of the base 12 at its opposite longitudinal ends.

The power unit 18, the ball screw 16, and the encoder device 20 are coaxially aligned with each other simply by securing the motor housing 40 and the encoder housing 46 to the base 12 as described above. As a result, the power unit 18, the ball screw 16, and the encoder device 20 can easily be assembled in coaxial alignment because it is not necessary to adjust them for coaxial alignment with each other.

Operation of the electric actuator 10 will be described below.

A power supply electrically connected to the electric motor of the power unit 18 is turned on to energize the electric motor. The ball screw 16 is rotated about its own axis, causing the bearing block 60 to displace the slide table 52 longitudinally along the ball screw 16 and hence the base 12. The slide table 52 thus can convey a workpiece which is carried thereon over a desired distance along the electric actuator 10.

Inasmuch as the guide lands 32a, 32b which confront each other are integrally formed with the base 12, the electric actuator 10 has a smaller height or vertical dimension than with the conventional electric actuator in which the frame and the guide rails are separate from, and assembled with, each other. The electric actuator 10 is thus relatively small and light, is made up of a relatively small number of parts, and can be manufactured relatively inexpensively.

An electric actuator 80 according to a second embodiment of the present invention will be described below with reference to FIGS. 3 through 10. Those parts shown in FIGS. 3 through 10 which are identical to those shown in FIGS. 1 and 2 are denoted by identical reference characters, and will not be described in detail below.

Figure 3:
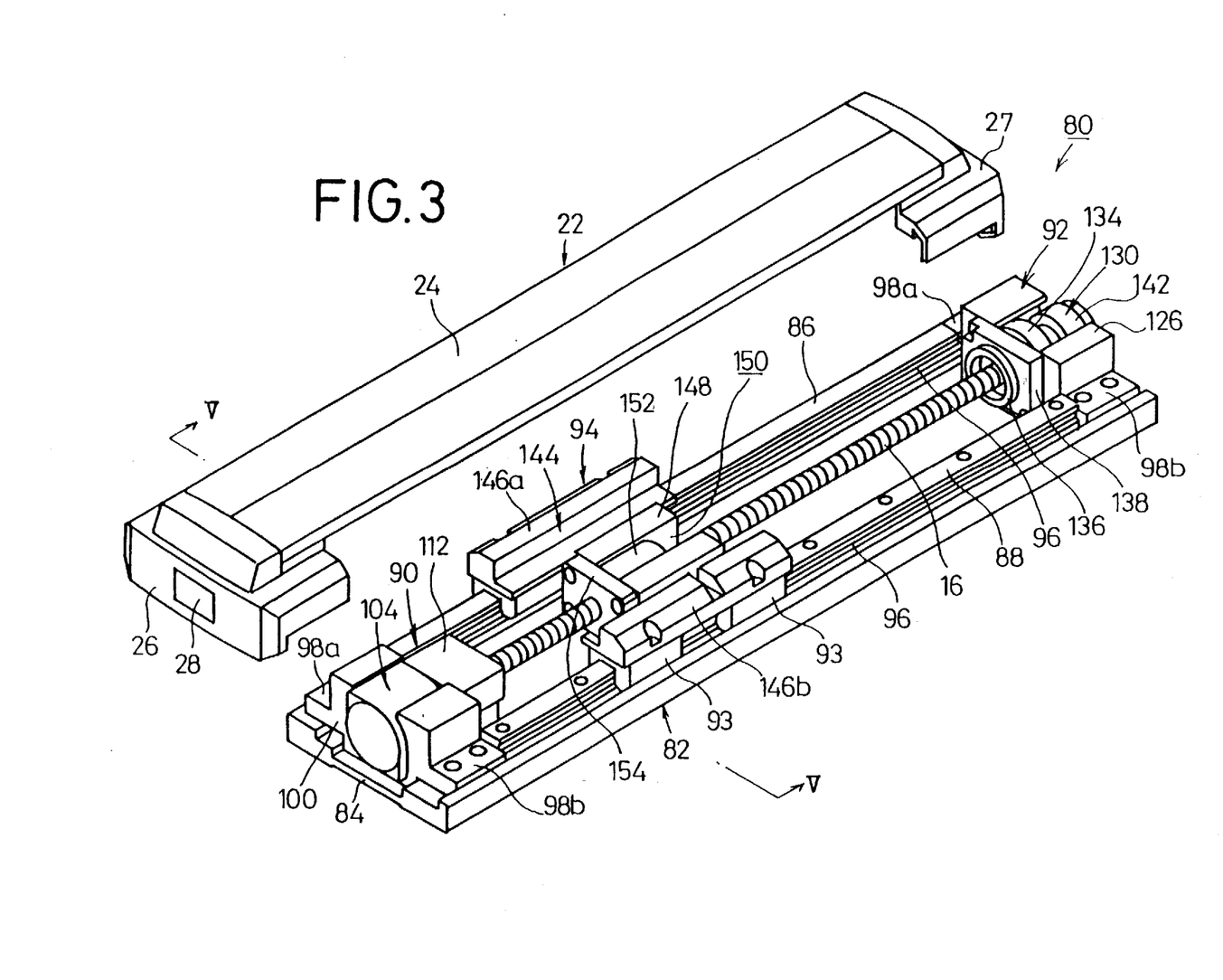
FIG. 3 is an exploded perspective view of an electric actuator according to a second embodiment of the present invention.

The electric actuator 80 according to the second embodiment differs from the electric actuator 10 according to the first embodiment in that an elongate guide land 86 is integrally formed with and extends along a longitudinal edge of a flat plate 84 of an elongate base 82, and an elongate guide rail 88 separate from the base 82 is fixedly mounted on and extends along an opposite longitudinal edge of the flat plate 84, the guide rail 88 being of substantially the same shape as the guide land 86.

The electric actuator 80 according to the second embodiment essentially comprises the elongate base 82, a ball screw 16 longitudinally supported on an upper surface of the base 82, a power unit 90 mounted on a longitudinal end of the base 82 for rotating the ball screw 16 about its own axis, an encoder device 92 mounted on the other longitudinal end of the base 82, and a cover 22 covering the upper surface of the base 82. The electric actuator 80 also has a slide mechanism 94 displaceable longitudinally along the base 82 in response to rotation of the ball screw 16 while being guided by four bearing blocks 93 in two pairs which are positioned in confronting relation to each other one on each side of the ball screw 16. The bearing blocks 93 have respective ball bearings (not shown) that rollingly move and circulate in and along guide grooves 96 (described later on).

The base 82 is of a unitary structure made of steel (SPC) or the like by a drawing process, and hence has a high degree of rigidity. The guide land 86 which projects upwardly is integrally formed with one longitudinal edge of the flat plate 84. The guide rail 88 is fastened to an upper surface of the opposite longitudinal edge of the flat plate 84 which is transversely spaced from the guide land 86 (see FIG. 4). The guide land 86 and the guide rail 88 have confronting inner wall surfaces having respective guide grooves 96 defined longitudinally therein. The bearing blocks 93 are movably mounted on the guide land 86 and the guide rail 88 such that the ball bearings of the bearing blocks 93 rollingly ride in the guide grooves 96. The bearing blocks 93 are of a shape identical to each other. The guide rail 88 preferably has an automatic alignment function to keep the corresponding bearing blocks 93 aligned with the guide rail 88. Such an automatic alignment function allows attachment surfaces of the guide rail 88 to be machined with relatively large tolerances.

The power unit 90 comprises a motor housing 100 having a pair of arms 98a, 98b projecting away from each other transversely of the base 82 and fastened to respective upper surfaces of the guide land 86 and the guide rail 88, and a motor unit 104 fitted in an opening 102 defined axially in the motor housing 100. The motor housing 100 is preferably extrusion-molded of aluminum and has a fitting slot 106 (see FIG. 4) defined in a curved inner wall surface of the opening 102. The base 82 has a substantially rectangular recess 108 defined in an upper surface of the longitudinal end thereof on which the power unit 90 is mounted. The motor housing 110 has a lower surface 110 (see FIG. 5) fitted in the recess 108, and hence is securely positioned with respect to the base 82 (see FIG. 9).

Figure 7:
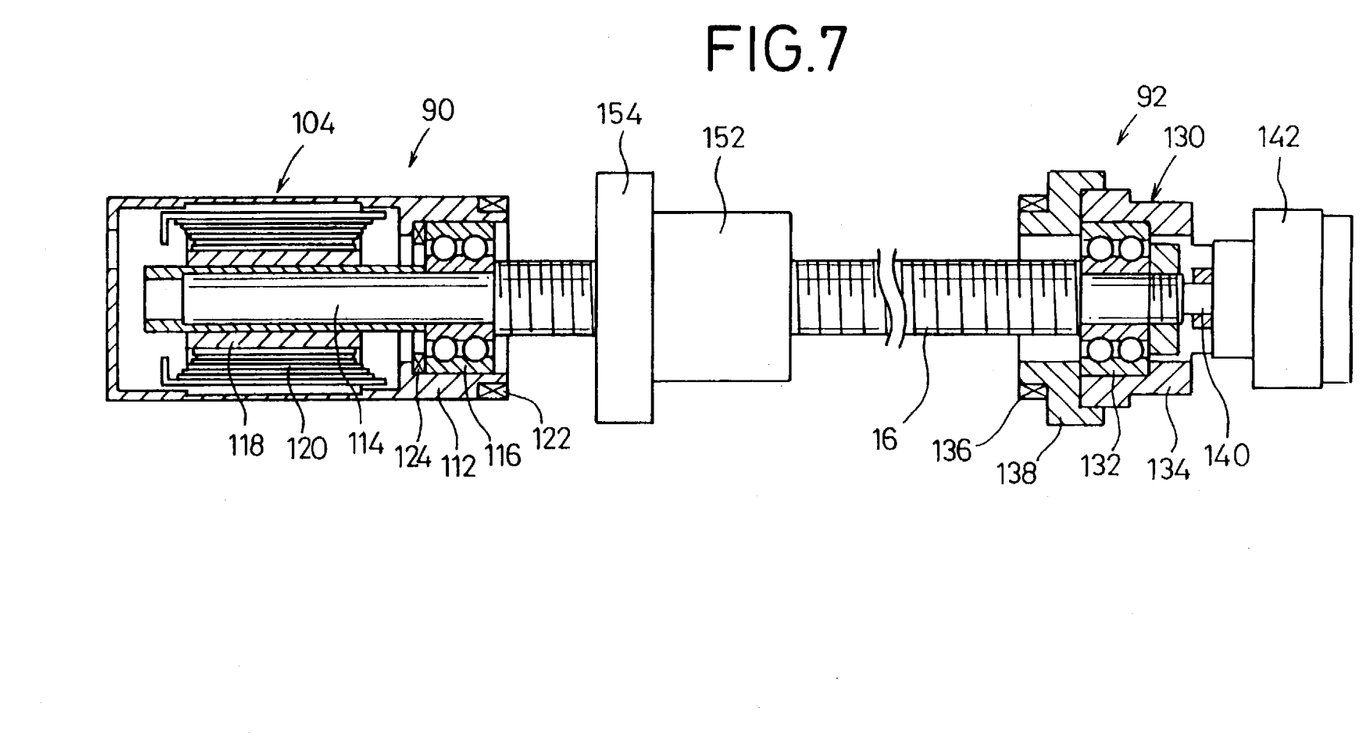
FIG. 7 is a longitudinal cross-sectional view of a drive unit and an encoder of the electric actuator shown in FIG. 3.
Figure 8:
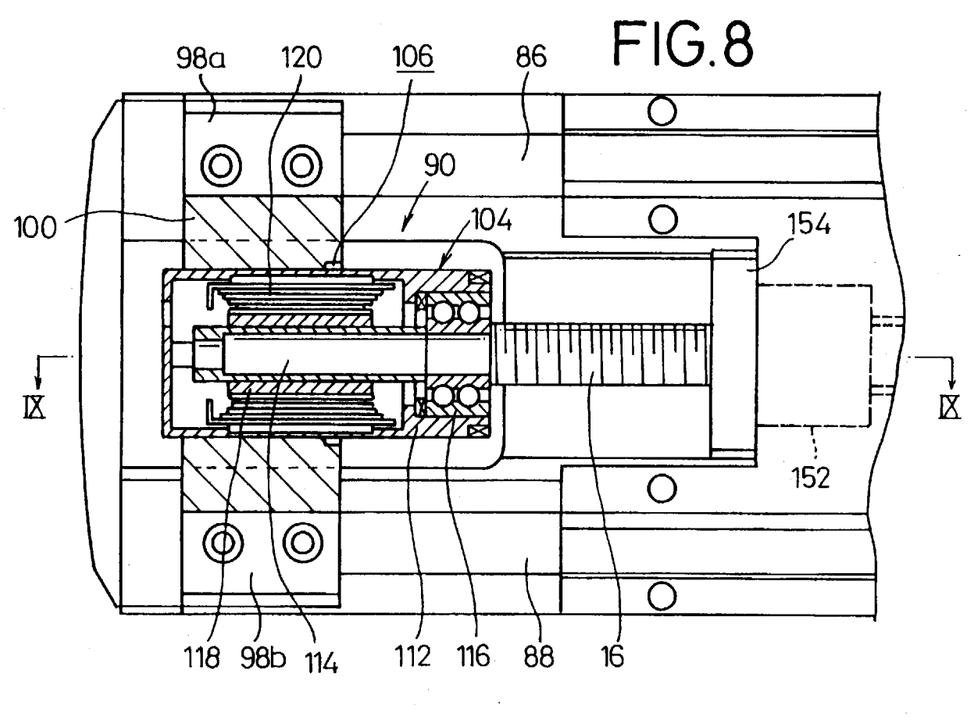
FIG. 8 is a fragmentary cross-sectional view of the drive unit of the electric actuator shown in FIG. 3.
Figure 9:
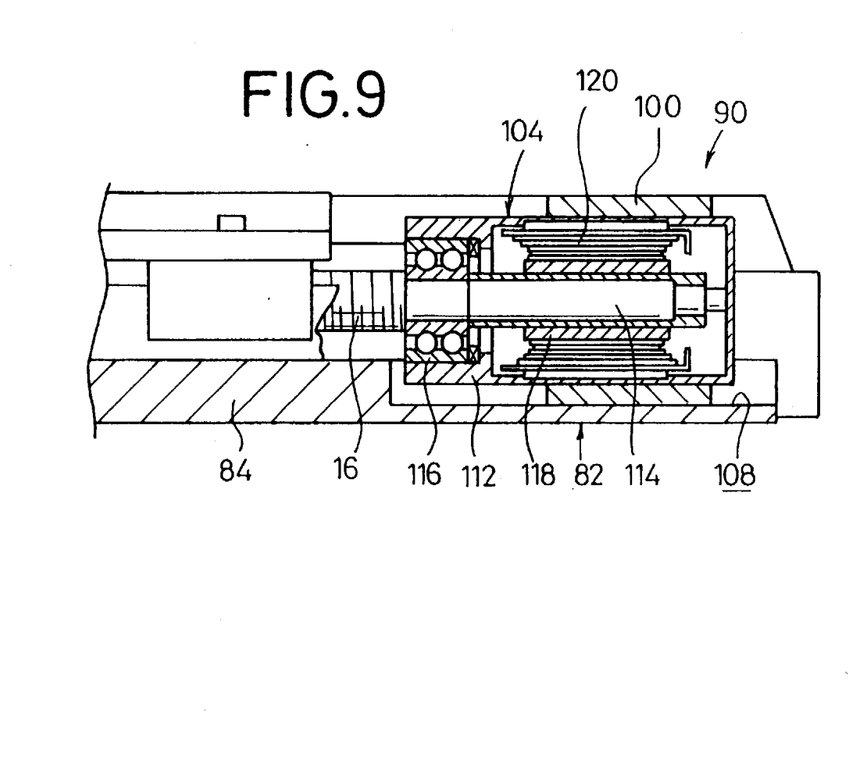
FIG. 9 is a cross-sectional view taken along line IX—IX of FIG. 8.

As shown in FIGS. 7 through 9, the motor unit 104 has a casing 112 held in the opening 102, a bearing 116 disposed in the casing 112, a motor shaft 114 integrally coaxially joined to an end of the ball screw 16 and rotatably supported by the bearing 116, a rotor 118 fixedly mounted on the motor shaft 114, and a laminated stator 120 fixedly mounted on an inner wall surface of the casing 112. The stator 120 and the rotor 118 jointly make up an electric motor. A ring-shaped damper 122 is fitted over an end of the casing 112. A wave washer 124 is disposed within the casing 112 and held against one end of the bearing 116.

Figure 4:
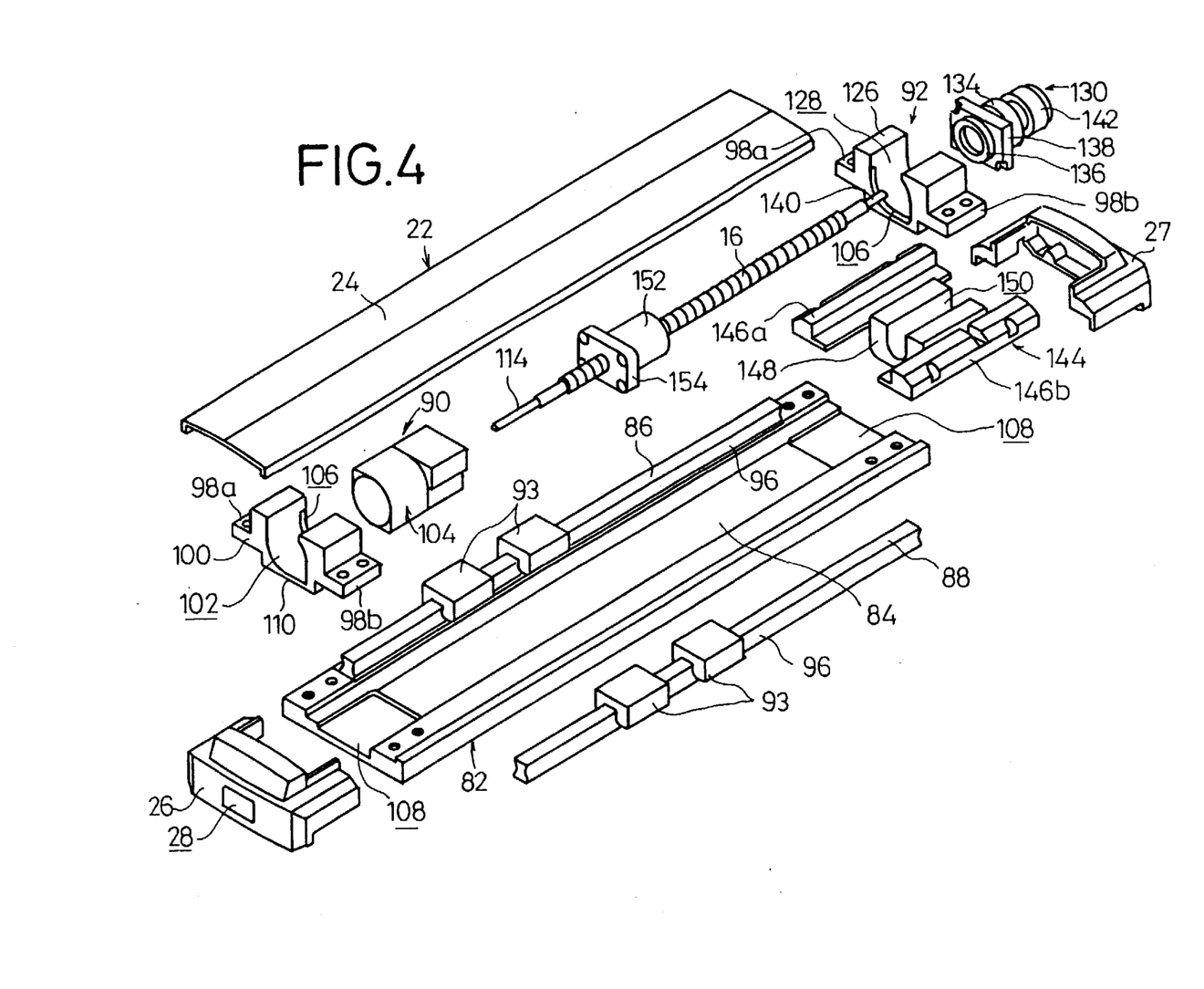
FIG. 4 is an exploded perspective view of the electric actuator shown in FIG. 3.
Figure 5:
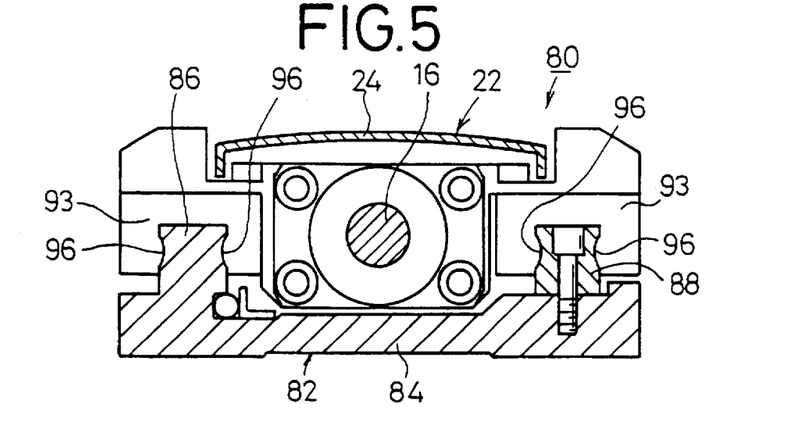
FIG. 5 is a transverse cross-sectional view taken along line V—V of FIG. 3.

As shown in FIG. 4, the encoder device 92 comprises an encoder housing 126 having a pair of arms 98a, 98b projecting away from each other transversely of the base 82 and fastened to respective upper surfaces of the guide land 86 and the guide rail 88, and an encoder unit 130 fitted in an opening 128 defined in the encoder housing 126. The encoder housing 126 is preferably extrusion-molded of aluminum and has a fitting slot 106 defined in a curved inner wall surface of the opening 128. The encoder housing 126 is. positioned in place on the base 82 with a lower surface 110 of the encoder housing 126 being received in a substantially rectangular recess 108 which is defined in an upper surface of the longitudinal end of the base 82 on which the encoder device 92 is mounted.

Figure 10:
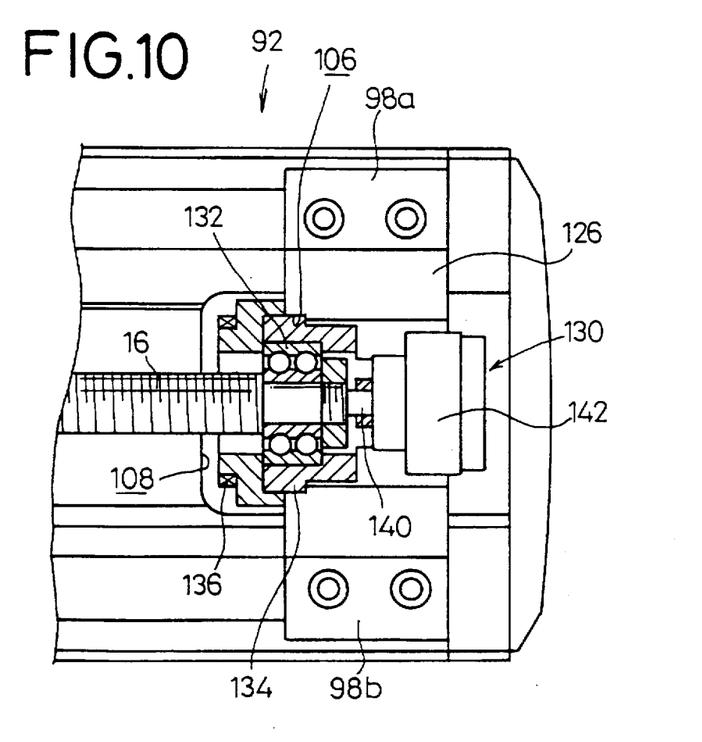
FIG. 10 is a fragmentary cross-sectional view of the encoder of the electric actuator shown in FIG. 3.

As shown in FIGS. 7 and 10, the encoder unit 130 comprises a bearing 132 by which the ball screw 16 is rotatably supported, a substantially cylindrical holder block 134 holding the bearing 132 and positioned in place with a corner thereof being fitted in the fitting slot 106 (see FIG. 10), a cover block 138 coupled to the holder block 134 and supporting a ring-shaped damper 136 on its distal end, and a rotary encoder 142 having an encoder shaft 140 integrally formed with an opposite end of the ball screw 16 for detecting the angular displacement, the rotational speed, etc. of the electric motor and hence the ball screw 16.

Figure 6:
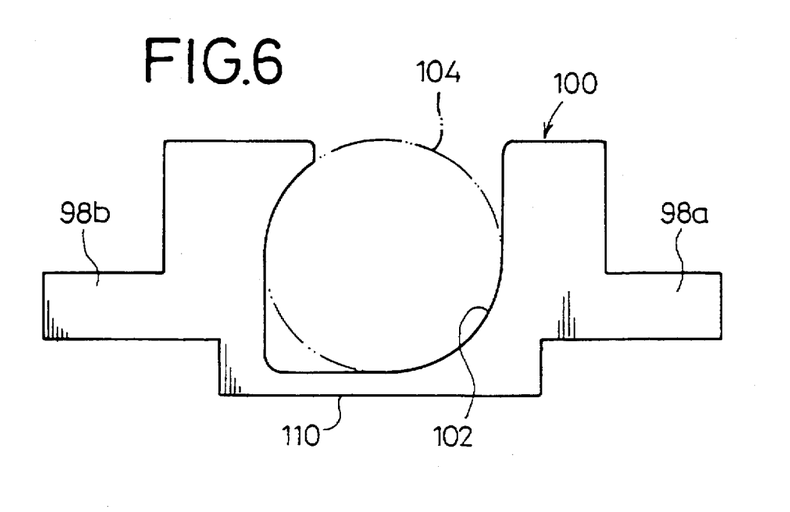
FIG. 6 is a front elevational view of a motor housing of the electric actuator shown in FIG. 3.

The motor housing 100 and the encoder housing 126 are of substantially the same shape as each other, and the openings 102, 128 defined respectively therein have substantially the same diameter as each other (see FIG. 6). When the motor unit 104 and the encoder unit 130 are fitted in the respective openings 102, 128, and the motor housing 100 and the encoder housing 126 are positioned by being fitted in the respective recesses 108 and fastened to the respective longitudinal ends of the base 82 through the arms 98a, 98b, the motor shaft of the power unit 90, the ball screw 16, and the encoder device 92 are coaxially aligned with each other. As a result, the power unit 90 and the encoder device 92 can easily be assembled on the base 82 without an alignment process for the motor shaft and the ball screw 16.

The slide mechanism 94 includes a slide table 144 for supporting a workpiece through attachment holes (not shown) defined in an upper surface of the slide table 144. The slide table 144 comprises a pair of slide blocks 146a, 146b slidably on and along the guide land 86 and the guide rail 88, respectively, and a holder block 148 integrally joined to and extending transversely between the slide blocks 146a, 146b. The slide blocks 146a, 146b are mounted on the respective pairs of the bearing blocks 93. The holder block 148 has an opening 150 defined centrally therein which extends in the axial direction of the ball screw 16. The opening 150 holds therein a substantially cylindrical bearing block 152 which is threaded over the ball screw 16 and has a flange 154 fastened to an end of the holder block 148.

Other structural details, operation, and advantages of the electric actuator 80 according to the second embodiment are identical to those of the electric actuator 10 according to the second embodiment, and will not be described in detail below.

The electric actuators 10, 80 offer the following advantages:

The electric actuators 10, 80 are relatively small and light because their height or vertical dimension is restricted while their rigidity is maintained at a high level.

Since at least one of the guide lands is integrally formed with the base, the electric actuators 10, 80 are made up of a relatively small number of parts and assembled in a relatively small number of steps, and hence can be manufactured relatively inexpensively.

The ball screw 16 can easily be positioned and assembled because no special alignment process is required to align the ball screw 16 coaxially with the power units 18, 90 and the encoder devices 20, 92.

Although certain preferred embodiments of the present invention has been shown and described in detail, it should be understood that various changes and modifications may be made therein without departing from the scope of the appended claims.

What is claimed is:

1. An electric actuator comprising:

an elongate base;

a slide mechanism having a slide table slidably mounted on said elongate base for longitudinal displacement therealong;

rotational power means fixedly mounted on a longitudinal end of said elongate base, for displacing said slide table longitudinally along said elongate base;

detecting means fixedly mounted on an opposite longitudinal end of said elongate base, for detecting a rotational quantity of said rotational power means;

power transmitting means connected to said slide mechanism, said rotational power means, and said detecting means, for transmitting rotational power from said rotational power means to said slide table; and guide means integrally mounted on said base, for guiding said slide table longitudinally along said elongate base.

2. An electric actuator according to claim 1, wherein said guide means comprises a pair of guide lands extending longitudinally along said base and spaced transversely from each other, said guide lands being integral with said base.

3. An electric actuator according to claim 1, wherein said guide means comprises a guide land extending longitudinally along said base and integral with said base, further comprising a guide rail extending longitudinally along said base and separate from and fastened to said base, said guide land and said guide rail being spaced transversely from each other.

4. An electric actuator according to claim 1, wherein said rotational power means comprises a motor housing mounted on said base and having an opening defined therein, and a motor unit fitted in said opening, and said detecting means comprises an encoder housing mounted on said base and having an opening defined therein, and an encoder unit fitted in said opening, and wherein said motor housing and said encoder housing are of a shape substantially identical to each other, and said opening defined in said motor housing and said opening defined in said encoder housing are of a dimension substantially identical to each other.

5. An electric actuator according to claim 2, wherein said guide lands have respective grooves defined in respective confronting inner wall surfaces thereof, further comprising at least one pair of bearing members mounted on said slide table and engaging in said grooves, respectively, for guiding said slide table longitudinally along said elongate base.

6. An electric actuator according to claim 5, wherein said bearing members include a fixed bearing member fixedly mounted on said slide mechanism and an eccentric bearing member adjustably mounted on said slide mechanism.

7. An electric actuator according to claim 1, wherein said rotational power means includes a motor shaft, and said detecting means includes an encoder shaft, said power transmitting means comprising a ball screw integral with said motor shaft and said encoder shaft, and wherein said ball screw, said motor shaft, and said encoder shaft are coaxially aligned with each other.

8. An electric actuator according to claim 1, wherein said slide table has a pair of slide blocks slidable along said guide means and a holder block integrally joined to and extending transversely between said slide blocks.

* * * * *